(12) United States Patent
Silvester

(10) Patent No.: US 7,715,959 B2
(45) Date of Patent: May 11, 2010

(54) PC-BASED AUTOMOBILE OWNER'S MANUAL, DIAGNOSTICS, AND AUTO CARE

(75) Inventor: Kelan C. Silvester, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 27 days.

(21) Appl. No.: 11/868,921

(22) Filed: Oct. 8, 2007

(65) Prior Publication Data

US 2008/0027603 A1 Jan. 31, 2008

Related U.S. Application Data

(62) Division of application No. 10/177,025, filed on Jun. 21, 2002, now Pat. No. 7,292,918.

(51) Int. Cl.
*G01M 17/00* (2006.01)
*G06F 7/00* (2006.01)
*G06F 19/00* (2006.01)

(52) U.S. Cl. .............................. 701/29; 701/30; 701/35; 702/183

(58) Field of Classification Search ................... 701/29, 701/33, 35; 702/183, 184, 185, 187; 340/438
See application file for complete search history.

(56) References Cited

U.S. PATENT DOCUMENTS

| | | | |
|---|---|---|---|
| 5,442,553 A | 8/1995 | Parrillo | |
| 5,808,907 A * | 9/1998 | Shetty et al. ................ | 702/188 |
| 6,009,355 A | 12/1999 | Obradovich et al. | |
| 6,175,782 B1 | 1/2001 | Obradovich et al. | |
| 6,181,994 B1 * | 1/2001 | Colson et al. ................. | 701/33 |
| 6,182,006 B1 * | 1/2001 | Meek ........................ | 701/200 |
| 6,275,231 B1 | 8/2001 | Obradovich | |
| 6,282,464 B1 | 8/2001 | Obradovich | |
| 6,314,422 B1 | 11/2001 | Barker et al. | |
| 6,330,337 B1 | 12/2001 | Nicholson et al. | |
| 6,360,551 B1 | 3/2002 | Renders | |
| 6,370,454 B1 * | 4/2002 | Moore ........................ | 701/29 |
| 6,370,455 B1 | 4/2002 | Larson et al. | |
| 6,397,131 B1 | 5/2002 | Busch et al. | |
| 6,459,969 B1 * | 10/2002 | Bates et al. .................... | 701/29 |
| 6,493,615 B1 | 12/2002 | Johnston | |
| 6,526,335 B1 | 2/2003 | Treyz et al. | |
| 6,556,904 B1 | 4/2003 | Larson et al. | |
| 6,622,083 B1 * | 9/2003 | Knockeart et al. .......... | 701/202 |
| 6,714,846 B2 | 3/2004 | Trsar et al. | |
| 6,801,849 B2 | 10/2004 | Szukala et al. | |
| 6,922,616 B2 * | 7/2005 | Obradovich et al. ........... | 701/1 |
| 7,023,332 B2 * | 4/2006 | Saito et al. .................. | 340/438 |
| 7,209,817 B2 * | 4/2007 | Abdel-Malek et al. ........ | 701/33 |
| 2002/0103583 A1 | 8/2002 | Ohmura et al. | |
| 2003/0097211 A1 | 5/2003 | Carroll et al. | |
| 2004/0210363 A1 * | 10/2004 | Katagishi et al. .............. | 701/33 |
| 2005/0107925 A1 | 5/2005 | Enigk et al. | |

* cited by examiner

*Primary Examiner*—Tan Q. Nguyen
(74) *Attorney, Agent, or Firm*—Marger Johnson & McCollom, P.C.

(57) ABSTRACT

A computer built into an automobile displays the owner's manual for the car. The user requests more information about the automobile through the computer, and the additional information is displayed to the user. Information may include a description of a specific function or device of the car, service history, and/or real time status of a component of the car.

22 Claims, 16 Drawing Sheets

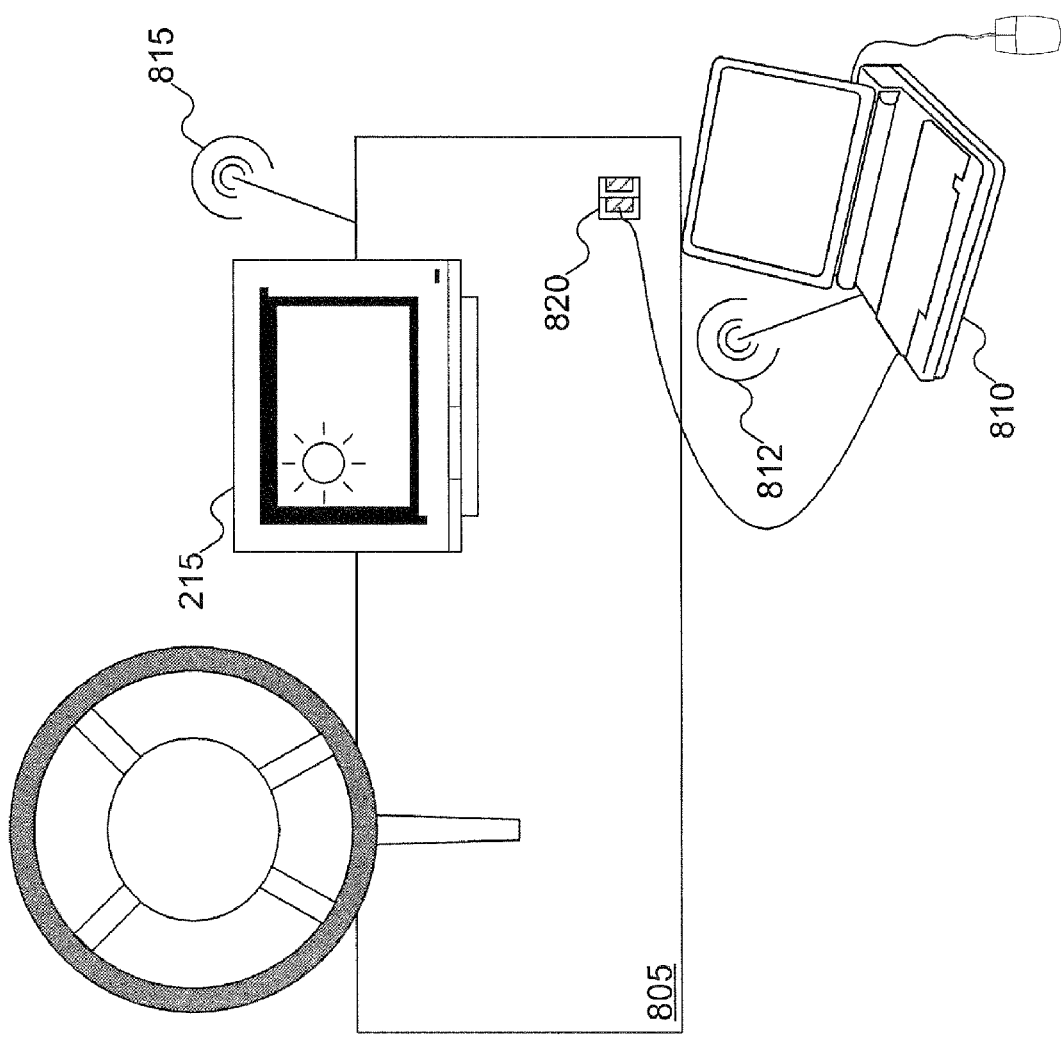

PC-BASED AUTOMOBILE OWNER'S MANUAL, DIAGNOSTICS, AND AUTO CARE

This patent application is related to U.S. patent application Ser. No. 11/868,922, filed Oct. 8, 2007 now U.S. Pat. No. 7,292,918, which is a divisional of U.S. patent application Ser. No. 10/177,025, filed Jun. 21, 2002 now U.S. Pat. No. 7,292,918, and is hereby incorporated by reference for all purposes.

FIELD

This invention pertains to automobiles, and more particularly to the use of computers in automobiles.

BACKGROUND

The past few decades have witnessed an increase in the use of computers. Whereas once upon a time the only places computers could be found were in a research institutions, universities, or governmental organizations, today people interact with many computers during the day. Between home and business computers, automatic teller machines, personal digital assistants, and cell phones, the average person is in knowing contact with several computers. But computers can also be found in places where the average person might not expect. Refrigerators, toasters, and cash registers are just a few of the devices that most people do not realize include computers (typically referred to as embedded systems).

Another device that people use on a daily basis without conscious knowledge that the device includes embedded systems is the automobile. Built-in computers monitor the automobile's performance, adjusting components to keep the automobile working as smoothly as possible. For example, whereas once upon a time a backyard mechanic could adjust the idle on his carburetor, today computers automatically adjust the fuel injectors in the automobile.

The increased use of embedded systems in automobiles has had the indirect effect of increasing the complexity of the automobile. Today, the average person can add gasoline to the gas tank, check the oil level using the dipstick, verify the proper tension on the timing belt, and perhaps change a tire. Adjusting or repairing anything else is too complicated or requires specialized equipment. Specifically, accessing the built-in computer in an automobile is not a task easily accomplished by the average user. The automobile does not provide easy access to the computer.

Because there is little for the average user to do but take the car to a mechanic, automobile manufacturers are simplifying the design of the dashboard display. Many cars today include an "idiot light," which says something to the effect of "Service Car Soon." The user then takes the car to the mechanic, who figures out exactly why the "idiot light" activated and fixes the problem.

BRIEF DESCRIPTION OF THE DRAWINGS

FIG. 8 shows a configuration of the dashboard of the automobile of FIG. 1, according to an embodiment of the invention.

DETAILED DESCRIPTION

Figure 1:
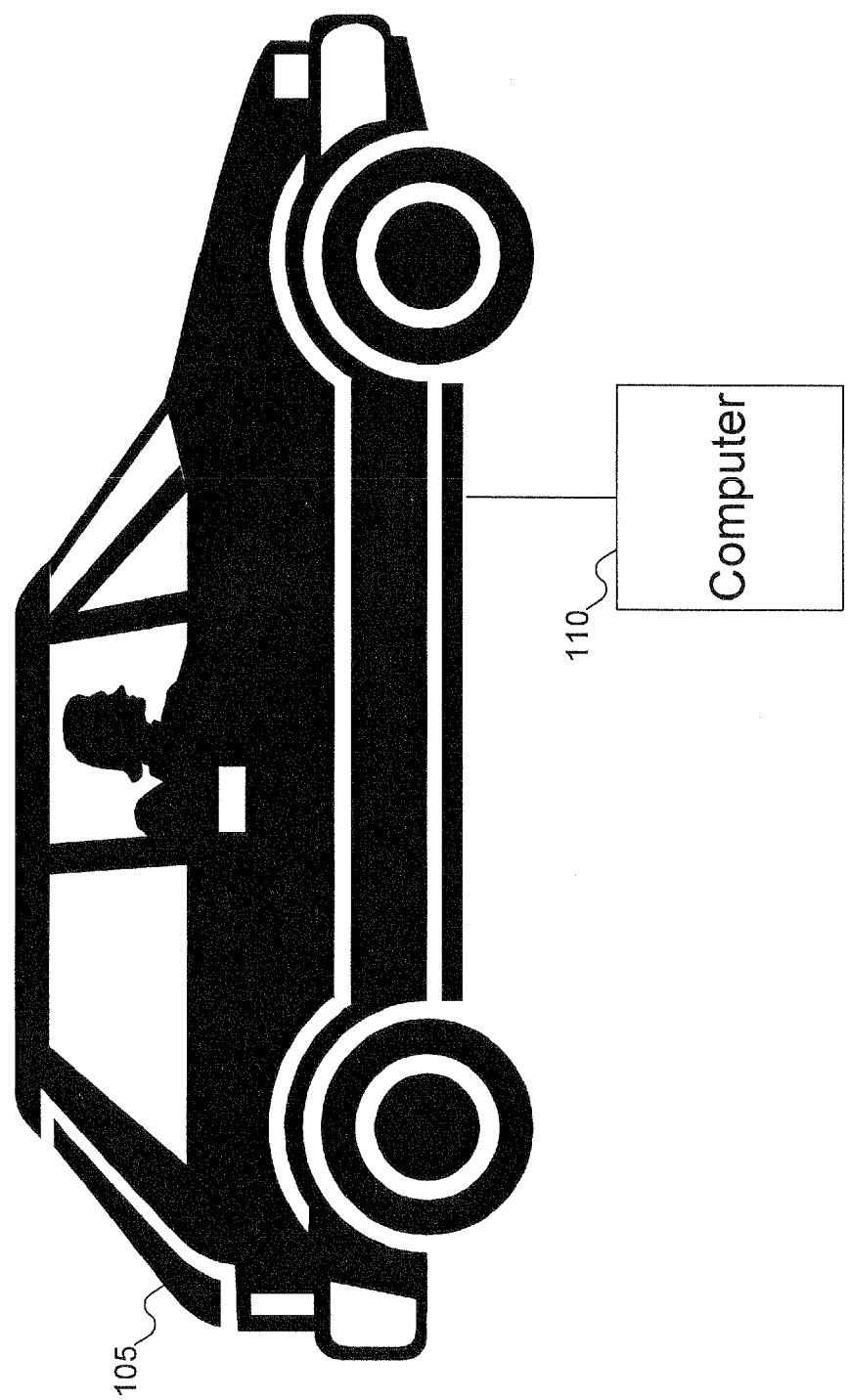
FIG. 1 shows an automobile with an embedded computer, according to an embodiment of the invention.

FIG. 1 shows an automobile with an embedded computer, according to an embodiment of the invention. In FIG. 1, automobile 105 is shown with built-in computer 110 (making automobile 105 an example of an embedded system). FIG. 1 shows automobile 105 as a hatchback-type automobile. But a person skilled in the art will recognize that any type of automobile, and indeed any type of personal conveyance with a built-in computer (an example of an embedded system), may be substituted for automobile 105. For example, if a bicycle is equipped with a built-in computer, the bicycle may be equipped with an embodiment of the invention. In addition, there is no limitation on the particular make or model of the conveyance to which an embodiment of the invention may be applied. For simplicity, in the remainder of this document (including the claims and drawings), the term "automobile" is intended to include all varieties of personal conveyances to which an embodiment of the invention may be applied.

Figure 2:
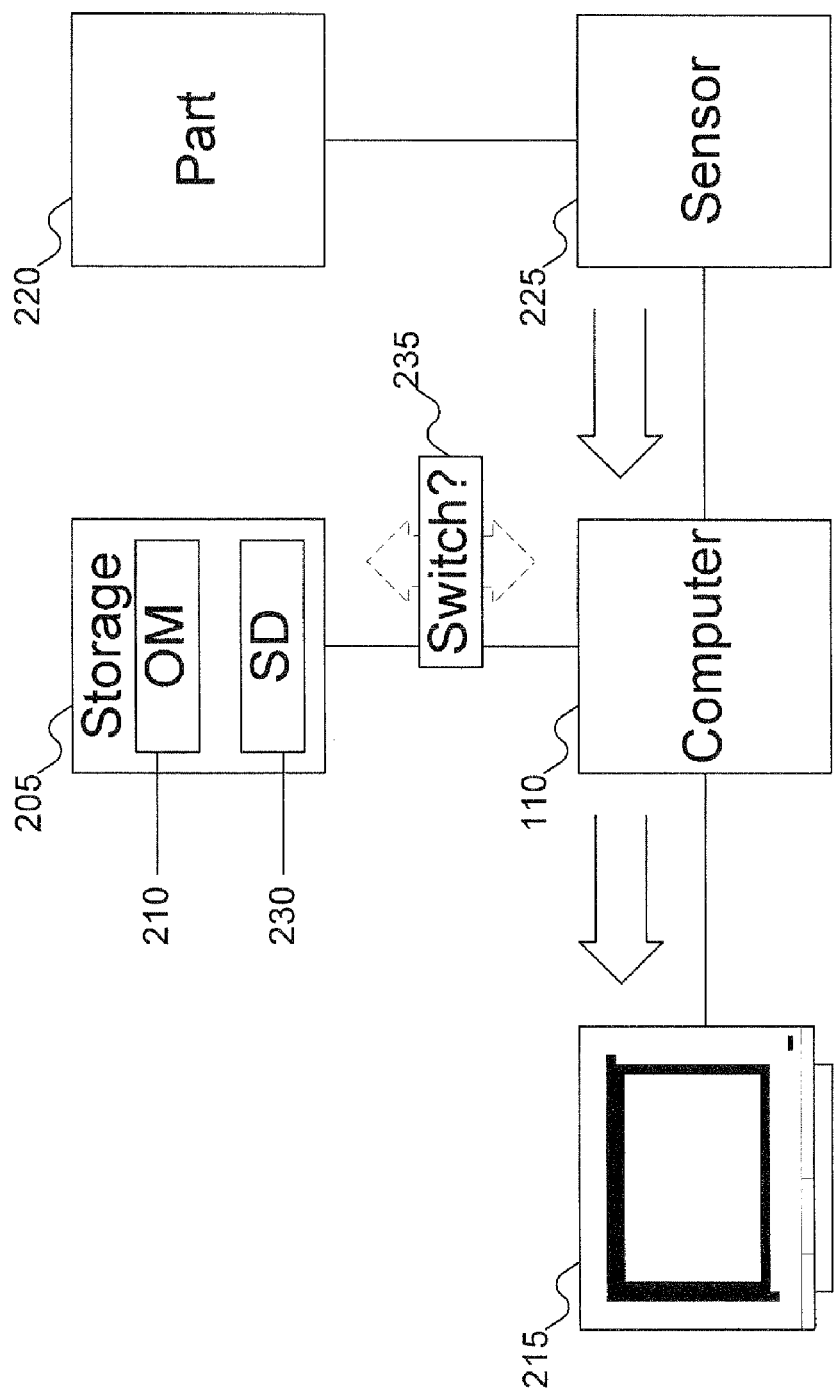
FIG. 2 shows the computer of FIG. 1 receiving information from various sources and displaying the information on a built-in display, according to an embodiment of the invention.

FIG. 2 shows the computer of FIG. 1 receiving information from various sources and displaying the information on a built-in display, according to an embodiment of the invention. In FIG. 2, computer 110 includes storage 205, wherein is stored owner's manual 210. Owner's manual 210 may be displayed on display 215. Display 215 may be built into the automobile: for example, as part of the dashboard or part of a system for playing video to entertain passengers. Alternatively, display 215 may be the display of another device that may send data to and receive data from computer 110. Where another device is used, the other device may be a notebook computer, handheld computer, Personal Digital Assistant (PDA), cellular telephone, or any other type of device capable of providing the information in some meaningful manner to the user. (In the remainder of this document, where the other device is mentioned, the other device is intended to include any of the above-mentioned devices.) How computer 110 interacts with another device is discussed further with reference to FIG. 8 below.

Owner's manual 210 includes the information that may be found in the bound copy of the owner's manual for the automobile (typically found the glove compartment of the automobile). But owner's manual 210 goes further. Owner's manual 210 is designed so that the user may interact with owner's manual 210.

Owner's manual 210 not only provides information on how to operate the automobile, but also enables the user to find out about the performance of the automobile. As shown in FIG. 2, computer 110 receives data about part 220 from sensor 225. Part 220 may be any part in the automobile: for example, a tire, the fuel injector, the radiator, etc. When the user requests information from owner's manual 210 about part 220, computer 110 may display the data received from sensor 225 as some of the information about part 220. This is discussed further with reference to FIG. 3 below.

FIG. 2 also shows storage 205 as storing sensor data 230. Not only may computer 110 display the real-time data to the user, but computer 110 may also store the data in storage 205 for later retrieval. For example, if sensor 225 is detecting the automobile speed, then sensor data 230 may store the speed history of the vehicle. This allows the user to determine how fast the automobile has been driven. Or, if sensor 225 is an impact sensor, then sensor data 230 may store any times the automobile sensed an impact. Then, instead of requesting the real-time data generated by sensor 225, the user may request sensor data 230 from storage 205. By retrieving sensor data 230 from storage 205, the user may review how others have used the car in his absence.

In another embodiment, whether computer 110 stores the data from sensor 225 as sensor data 230 in storage 205 is dependent on switch 235. The user may toggle switch 235 between enabled and disabled states. When switch 235 is in the disabled state, then computer 110 does not store the data from sensor 225 in storage 205. Of course, if the data is not stored in storage 205, the user may not later request sensor data 230.

Figure 3:
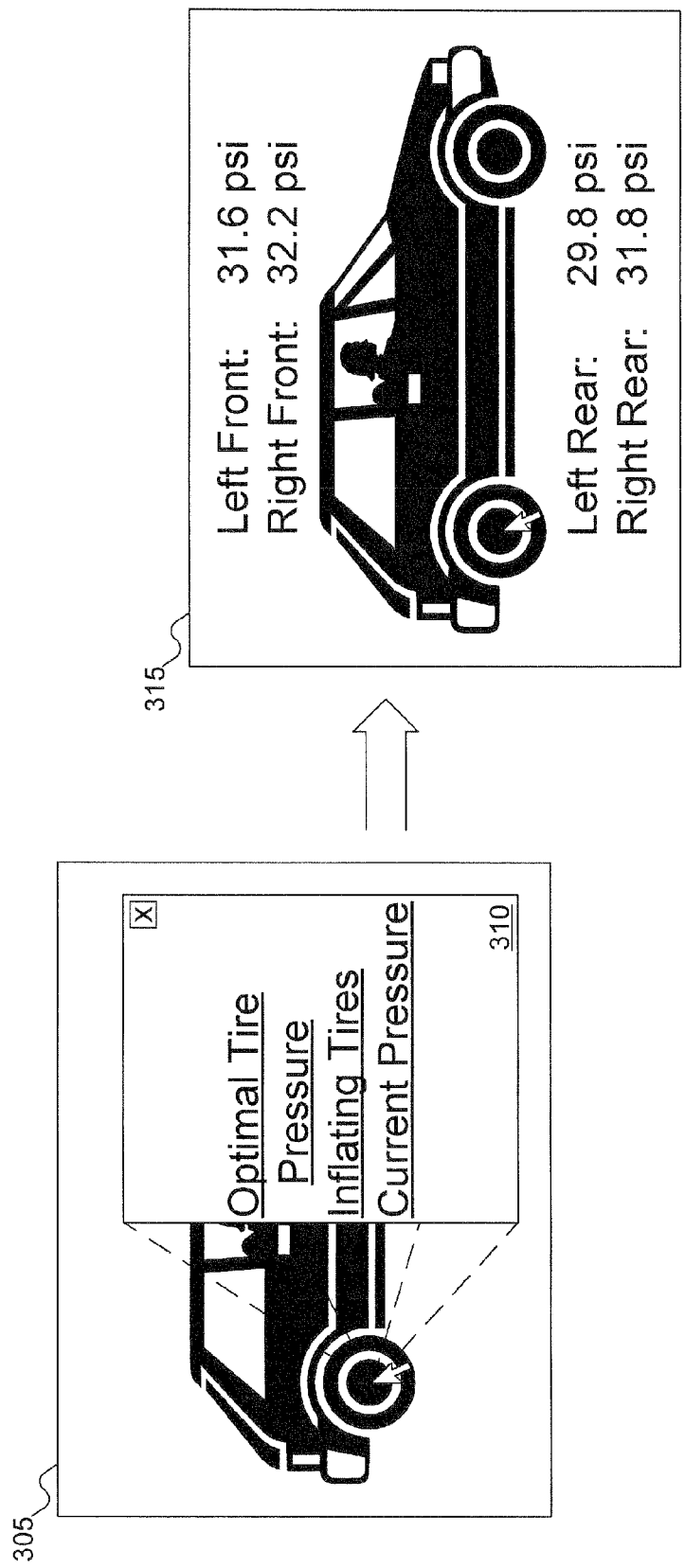
FIG. 3 shows the display of FIG. 2 providing information about the automobile of FIG. 1, according to an embodiment of the invention.

FIG. 3 shows the display of FIG. 2 providing information about the automobile of FIG. 1, according to an embodiment of the invention. In FIG. 3, the display is showing screen 305, which has an image of the automobile. When the user clicks on the tire, pop-up dialog 310 appears, allowing the user to specify the information he desires. For example, dialog 310 offers the user to find out the optimal tire pressure, how to properly inflate the tires, or the current tire pressure.

If the user selects the current tire pressure, then screen 315 appears. In screen 315, the current pressure for each of the tires is shown. For example, screen 315 shows the pressure in the left rear tire as 29.8 pounds per square inch (psi).

In FIG. 3, the user is shown selecting information about the tires using a mouse. But a person skilled in the art will recognize that other devices may be used to indicate portions of the screen 305. For example, screen 305 may be a touch screen, so that the user may point to the screen without using a pointing device. Or, when the technology is ready, the computer may sense where the user is looking, so that all the user has to do is hold his vision on a particular spot on the screen.

Figure 4:
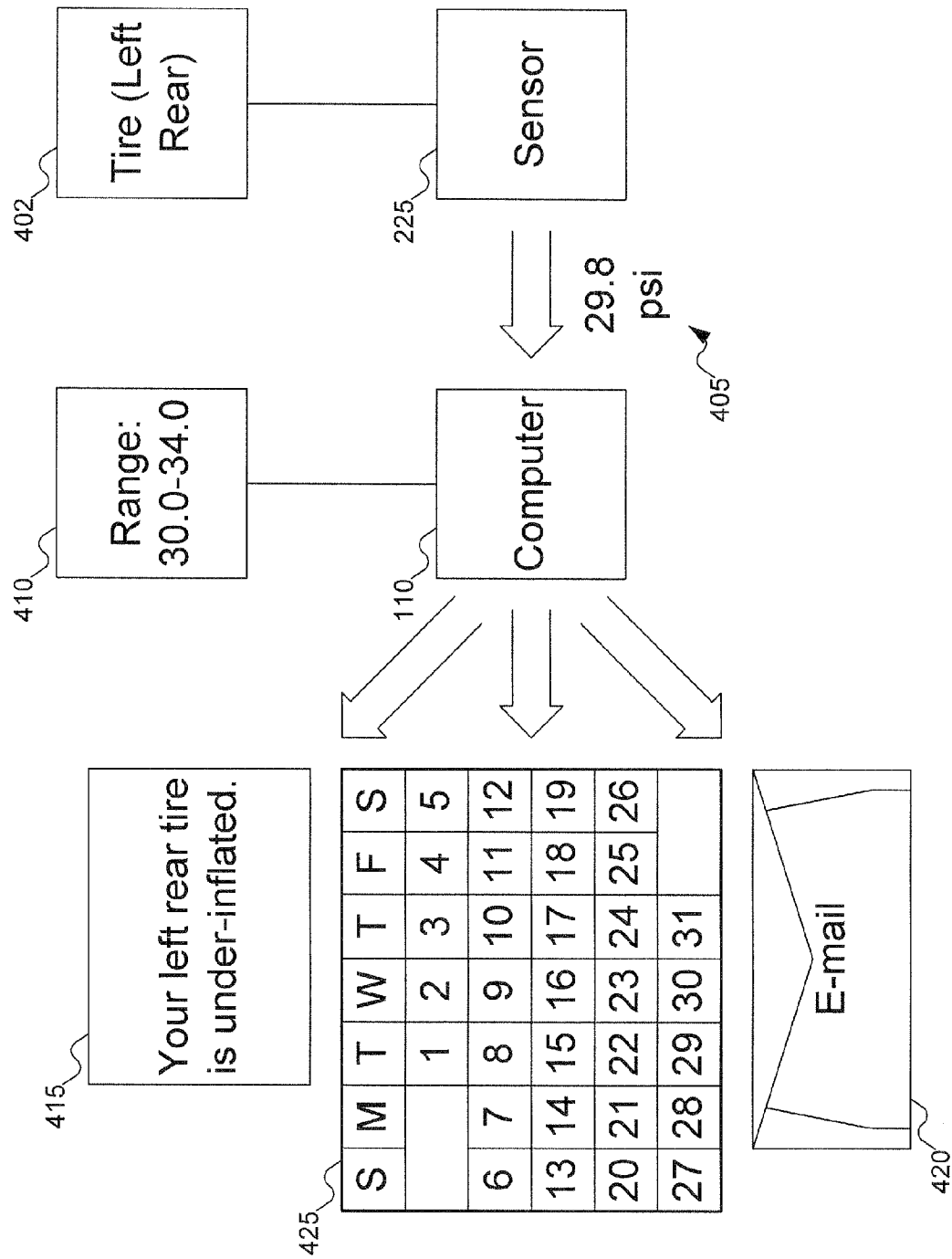
FIG. 4 shows the computer of FIG. 1 responding to a problem detected in the automobile of FIG. 1, according to an embodiment of the invention.

As shown in FIG. 3, in one embodiment the computer in the automobile displays information to the user upon request. In another embodiment, the computer monitors the automobile for problems, and takes action accordingly. FIG. 4 shows the computer operating in this embodiment.

In FIG. 4, the part being monitored is left rear tire 402. But a person skilled in the art will recognize that any part in the automobile may be monitored in a similar manner. For example, instead of the left rear tire, the monitored part may be the fuel injection system, or the catalytic converter, or the oil pan (for quantity or clarity of oil), etc. Sensor 225 is monitoring the tire for problems. Although sensor 225 is shown as monitoring only the pressure of left rear tire 402, a person skilled in the art will recognize that sensor 225 may monitor any state of the part, and may monitor multiple states at the same time (for example, sensor 225 might also be monitoring the tread on left rear tire 402 for wear). Sensor 225 returns to computer 110 the current pressure of left rear tire 402, shown as value 405 (currently 29.8 psi).

Computer 110 compares value 405 received from sensor 225 with proper range 410 for the automobile. In this case, value 405 is outside range 410. Computer 110 then may take any of a number of different actions. For example, computer 110 may display message 415 to the user on a display in the automobile. (As discussed above with reference to FIG. 2, the display may be built in to the automobile (specifically for interacting with the computer by the user or for entertainment purposes) or may be part of another device with which the computer may communicate.) Alternatively, computer 110 may send e-mail 420 to the user, alerting him to the condition of left rear tire 402. Computer 110 may send the e-mail either through its own e-mail processing tools (if computer 110 has the functionality to send e-mail itself) or may use an e-mail processing tool in another device with which computer 110 may communicate. Another option is for computer 110 to schedule an appointment with a service center, and add the appointment to calendar 425 for the user automatically. A person skilled in the art will recognize that computer 110 may perform any combination of techniques to alert the user: for example, computer 110 may display message 415 and send the user e-mail 420.

Figure 5:
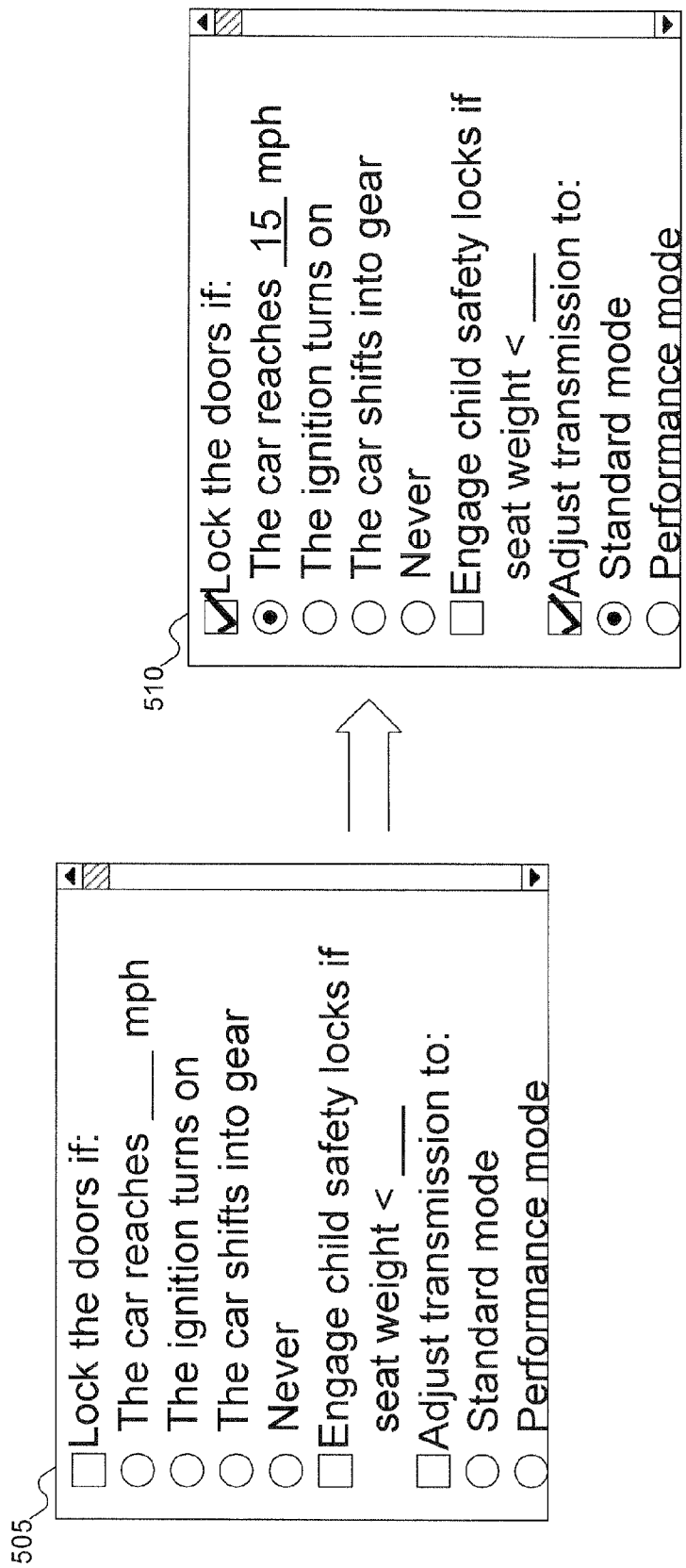
FIG. 5 shows the computer of FIG. 1 listing several programming options for the automobile of FIG. 1, according to an embodiment of the invention.

FIG. 5 shows the computer of FIG. 1 listing several programming options for the automobile of FIG. 1, according to an embodiment of the invention. In FIG. 5, screen 505 shows the user some options for customizing automobile performance. For example, listed on screen 505 are options for automatically engaging the door locks, for automatically engaging child safety locks, and for automatically adjusting engine performance. More options may be present, as indicated by the scroll bar on the right side of screen 505. A person skilled in the art will recognize other options that may be customized using a screen like screen 505. Once displayed, the user may select any of the listed options and, if need be, provide a target value. For example, in screen 510, the user has selected to automatically lock the doors when the automobile reaches 15 miles per hour, and to use the standard mode for the automatic transmission.

Figure 6:
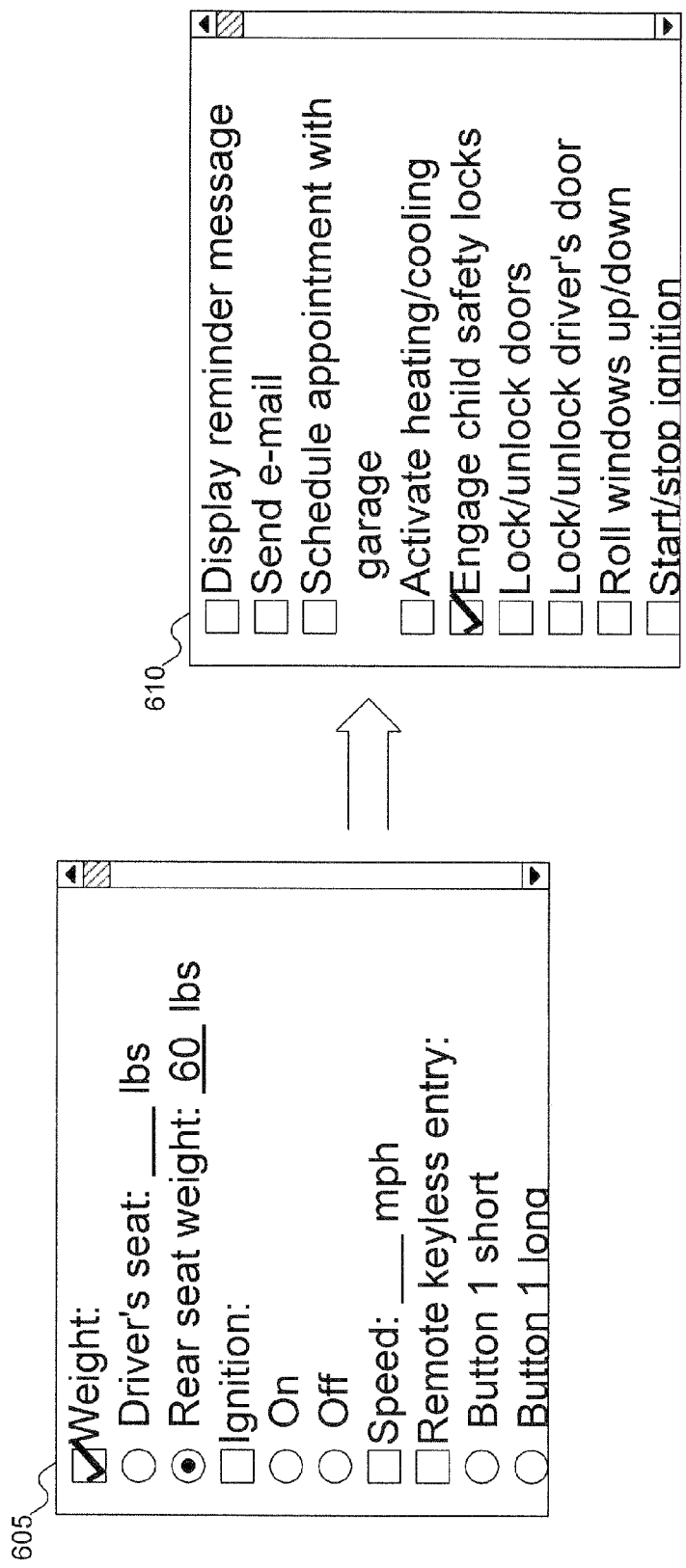
FIG. 6 shows the computer of FIG. 1 allowing the user to manually program the automobile of FIG. 1, according to an embodiment of the invention.

Although FIG. 5 shows the computer presenting the user with various predefined programming options, a person skilled in the art will recognize that there are other ways the computer may be programmed. For example, the computer may have a programming language that enables the user to program options that are not predefined. FIG. 6 shows this situation.

In FIG. 6, the computer displays a list of sensors in the automobile, and allows the user to select one (or more). By selecting more than one sensor, all the selected sensors need the specified values before the desired action occurs. The user may then enter a target value, if needed. For example, in screen 605, the user has selected a weight sensor: specifically, the weight sensor for the rear seat. This sensor requires a value, which the user has supplied (60 pounds). In contrast, for the ignition sensor, the user merely checks a box as to whether the ignition is to be on or off before the action occurs: no specific value is needed. Finally, the user may define one or more actions to take in response to the selected sensors. In screen 610, the user has selected to engage the child safety locks when the weight on the rear seat is less than 60 pounds.

In FIG. 6, the user is shown as selecting only one sensor. If the user selects more than one sensor, then the computer treats the combination of sensors to be conjunctive. That is, all of the sensors must return the indicated values before the actions are performed. If the user desires the same action to be performed for a number of different conditions, then the user has to add several programs, one for each condition. But a person skilled in the art will recognize how to modify the computer so that the user may program more complex conditions combining AND and OR operations (for example, a combination of the form "(A AND B) OR C").

In one embodiment, the computer is arranged to have complete (and extensive) lists of sensors and actions, which may be arranged to simplify the user's job in searching for a particular sensor or action. In a second embodiment, the list of sensor is limited to only those sensors that the user would normally find useful. For example, a sensor that determines whether there is cargo in the trunk might not normally be presented to the user, because the user would normally know if anything is in the trunk. But the user would be able to access this sensor if desired (perhaps by requesting a complete list of sensors rather than a shortened list). In a third embodiment, the list of actions is organized based on sensors, so that only certain actions are available based on the selection of certain sensors. For example, if the user selects a tire pressure sensor, the list of actions might not include the option to activate the heating/cooling system, since cabin temperature has little to do with tire pressure. Again, the user may access an unlisted action by requesting the complete list rather than the shortened list.

In a fourth embodiment, the computer is arranged to enable the user to define a new sensor or new action. For example, the user might add a new sensor to the automobile. Once the computer is made aware of the new sensor, it may be used just like any other sensor. Defining a new action may be more involved, but the procedure is somewhat similar. As an example, the user might add an entertainment system, including a video cassette player or a digital video disc (DVD) player and a television, to the automobile to entertain children during long trips. The user may then define a new action to turn on the television when the rear seat weight is low (indicating a child is sitting in the back seat). A person skilled in the art will recognize other ways in which the computer may be programmed.

Figure 7:
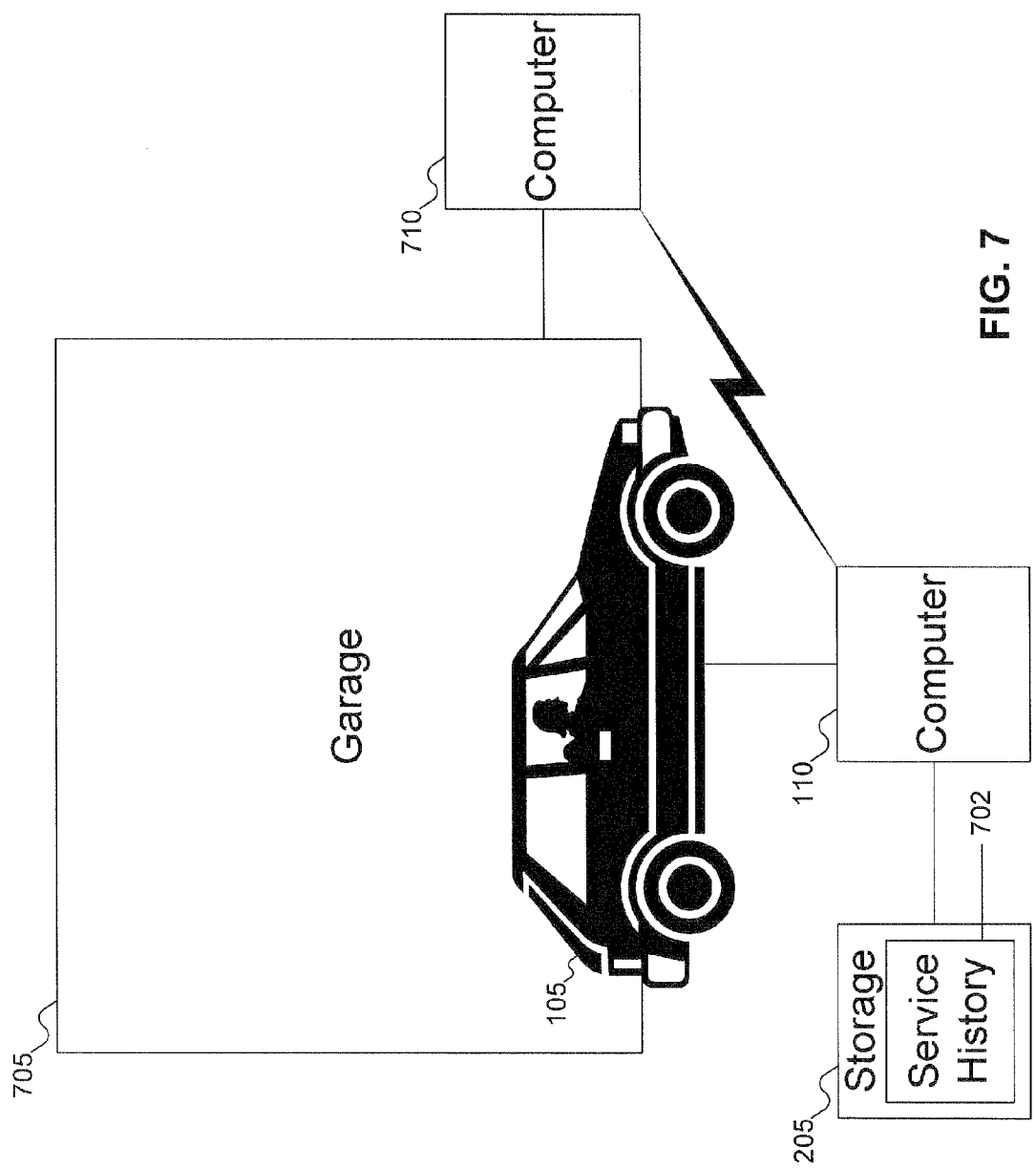
FIG. 7 shows the automobile of FIG. 1 at a garage, according to an embodiment of the invention.

FIG. 7 shows the automobile of FIG. 1 at a garage, according to an embodiment of the invention. As shown earlier with reference to FIG. 2, computer 110 includes storage 205. Aside from the owner's manual, storage 205 may store service history 702 of automobile 105. That is, every time automobile 105 is brought in for servicing, a complete record of the work performed on automobile 105 may be stored in storage 205. By storing the service history of automobile 105, the user does not have to worry about a new mechanic not knowing the history of automobile 105. The mechanic, for example a mechanic at garage 705, may retrieve service history 702 of automobile 105, either by accessing it directly from computer 110 or by interfacing computer 110 with computer 710 at the garage.

Of course, since service history 702 of automobile 105 is stored in computer 110, the user may access service history 702 himself, through either a built-in display or the display of a computer with which computer 110 may communicate.

FIG. 8 shows a configuration of the dashboard of the automobile of FIG. 1, according to an embodiment of the invention. In FIG. 8, dashboard 805 is shown. Built into dashboard 805 is display 215. Through display 215 is shown in FIG. 8 as sitting on dashboard 805, a person skilled in the art will recognize that display 215 may be built into the automobile in other ways: for example, flipping up from the dashboard (using a thin display, such as a liquid crystal display (LCD)), in a center console, or flipping down from the ceiling. FIG. 8 also shows display 215 as a touch screen, as indicated by the mark on the screen where the user has pressed his finger.

As mentioned above, as an alternative to having a display built into the automobile, the display may be part of another device. For example, notebook computer 810 is shown in FIG. 8. Using wireless transmitters/receivers 812 and 815, the computer in the automobile and notebook computer 810 may communicate. The wireless communications may use any wireless communications standard, such as Bluetooth (Specification of the Bluetooth System, Version 1.1, Feb. 22, 2001) or any of the Institute for Electrical and Electronics Engineers (IEEE) 802.11 standards, for example. As discussed above with reference to FIG. 2, other devices that may be used include handheld computers, PDAs, and cellular telephones.

In yet another embodiment, rather than using wireless communications, the computer in the automobile and notebook computer 810 may communicate using docking station 820. Docking station 820 may be a device into which notebook computer 810 physically connects at a hard contact point, or docking station 820 may be a wire-line connection to the computer in the automobile, such as a Universal Serial Bus (USB) connection or an IEEE 1394 (FireWire) connection. Any communications standard may be used to communicate between the computer in the automobile and notebook computer 820. A person skilled in the art will also recognize other ways the computer in the automobile and notebook computer 815 may connect.

As discussed above with reference to FIG. 4, the computer built into the automobile may monitor the automobile for problems, and alert the user. In an embodiment where display 215 is not built into the automobile, the computer may communicate with notebook computer 820, using either wireless transmitters/receivers 812 and 815, or via docking station 820, to inform the user of the detected problem. A person skilled in the art will recognize that this may be accomplished, even where notebook computer 820 is turned off.

Figure 9A:
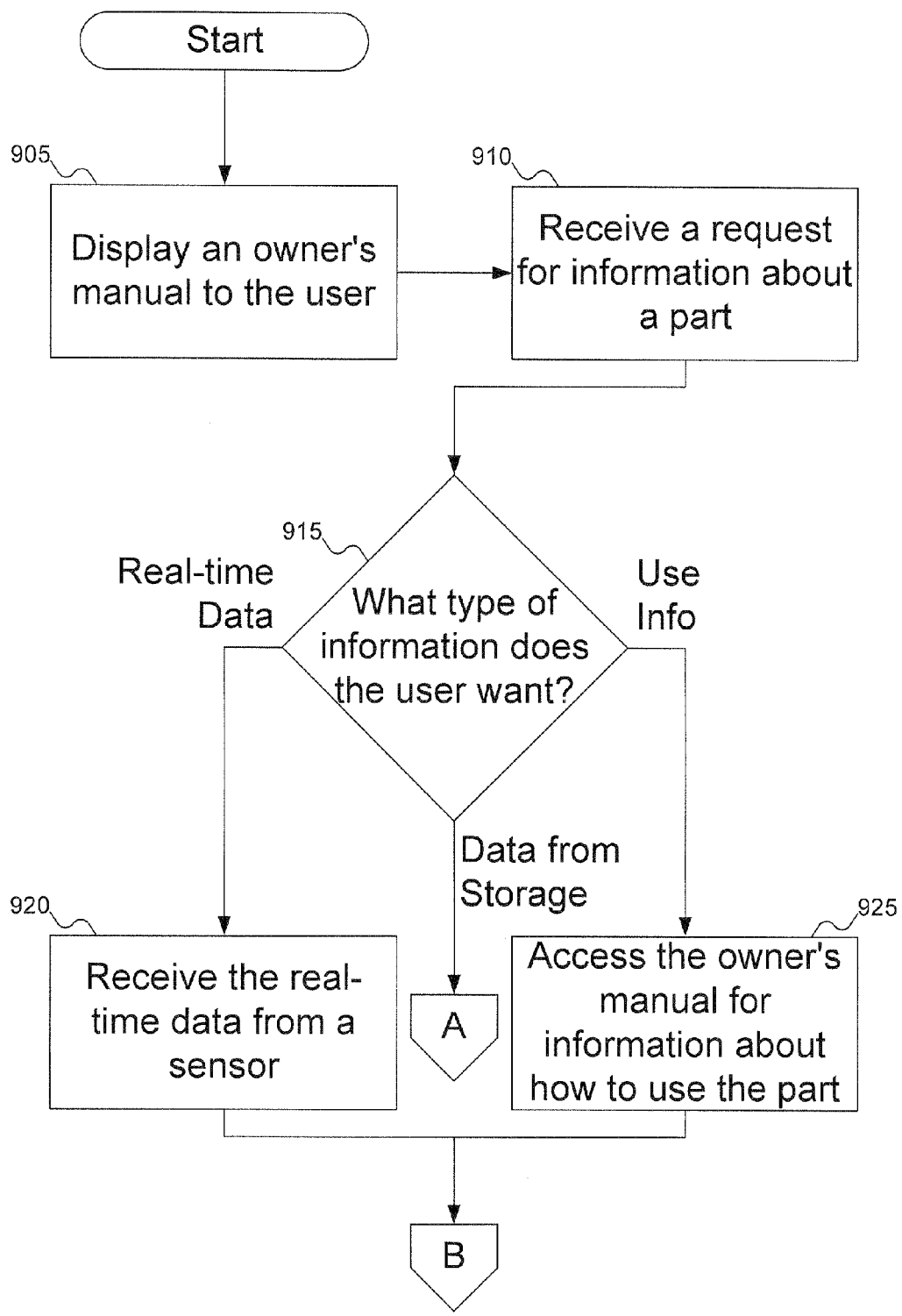
FIGS. 9A-9D show a flowchart of the procedure used by the computer of FIG. 1 to provide information about the automobile of FIG. 1 to the user, according to embodiments of the invention.
Figure 9B:
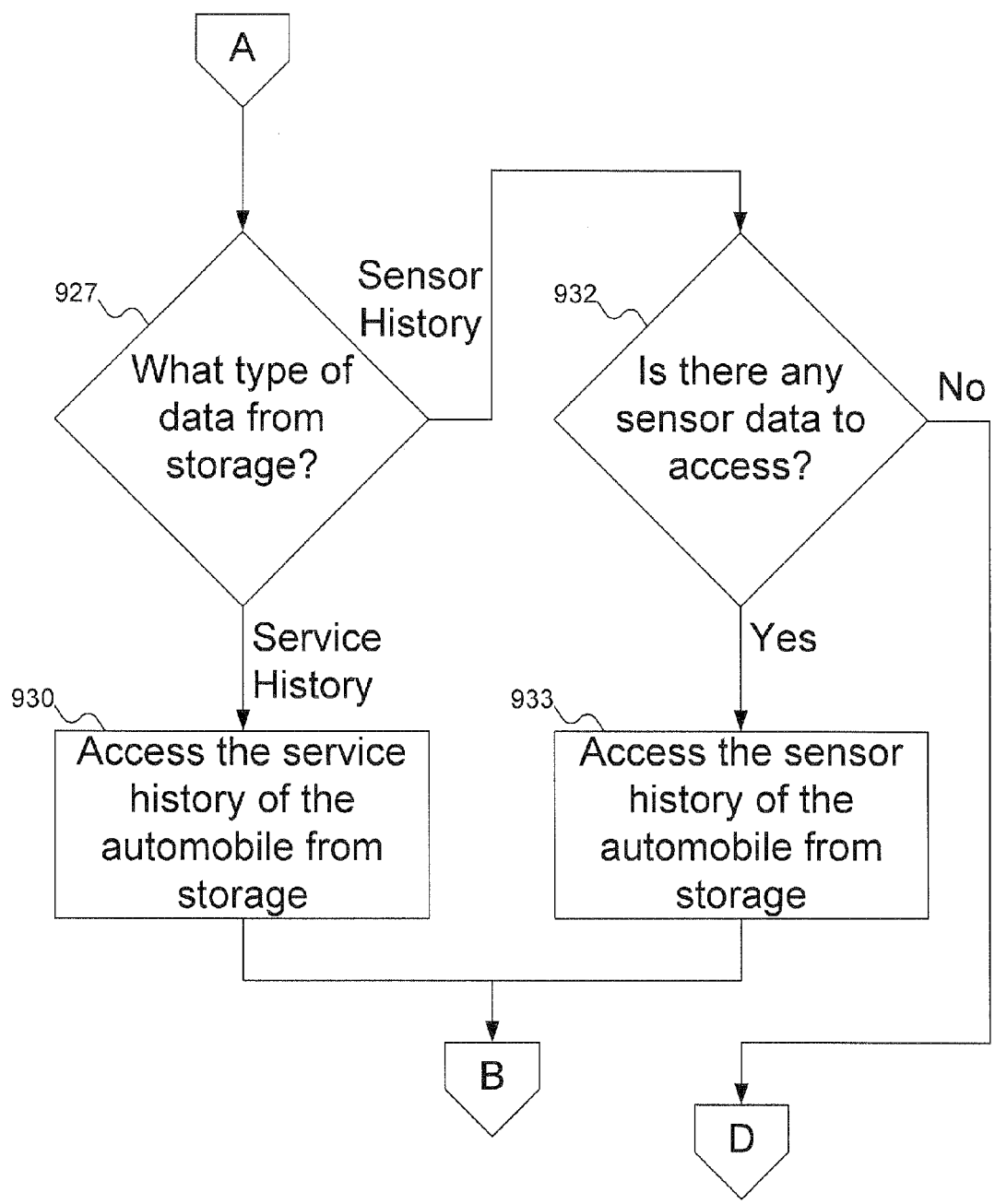
Figure 9C:
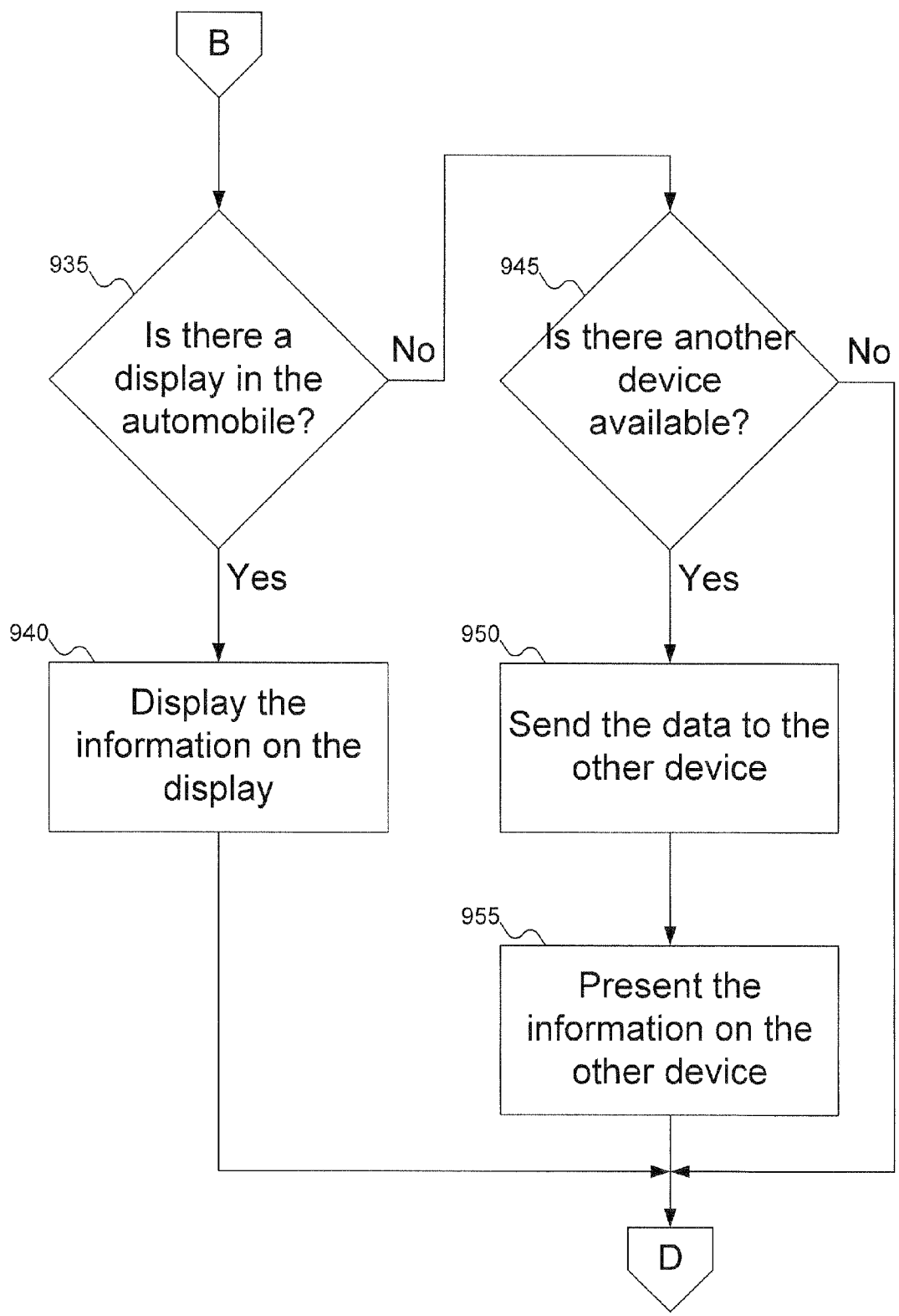
Figure 9D:
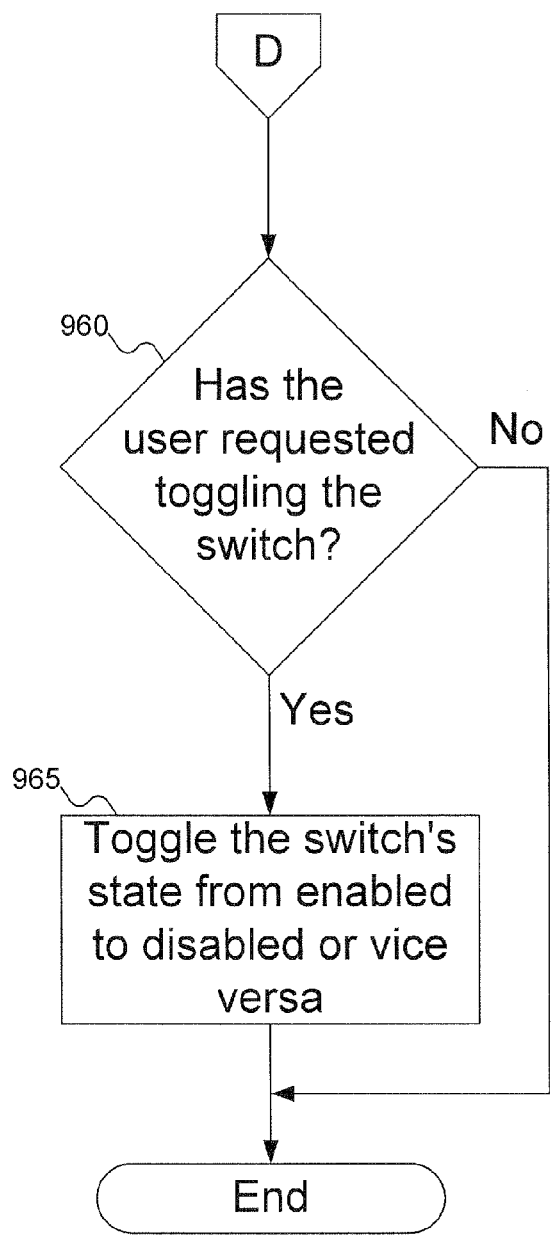

FIGS. 9A-9D show a flowchart of the procedure used by the computer of FIG. 1 to provide information about the automobile of FIG. 1 to the user, according to embodiments of the invention. In FIG. 9A, at block 905, the owner's manual is displayed to the user. At block 910, the computer receives a request for information from the user. At decision point 915, the computer decides what kind of data the user requested. If the user requested real-time data about a part of the automobile, then at block 920 the computer receives the real-time data from the appropriate sensor. If the user requested information about how to use the part, then at block 925 the computer accesses the appropriate information from the owner's manual.

If the user requested any data from the storage of the computer, then at decision point 927 (FIG. 9B) the computer determines whether the user requested the service history of the automobile or stored sensor data. If the user requested the service history of the automobile, then at block 930 the computer accesses the service history of the automobile from storage. If the user requested stored sensor data, then at decision point 932 the computer determines if there is any stored sensor data to access. If there is, then at decision point 933 the stored sensor data is accessed.

Regardless of the type of data requested by the user, at decision point 935 (FIG. 9C) the computer checks to see if there is a display built into the automobile. If there is, then at block 940 the computer displays the information on the built-in display. If there is no built-in display, then at decision point 945 the computer checks to see if there is another device that may present the information. If there is, then at block 950 the computer sends the information to the other device, which presents the information to the user at block 955. (It may happen that the other device has no display, but may present the information to the user in alternative formats: for example, aurally.)

Finally, at decision point 960 (FIG. 9D) the computer checks to see if the user has requested toggling the switch that controls whether sensor data is stored in the computer. If the user has requested toggling the switch, then at block 965 the computer toggles the switch's state. Thus, if sensor data was being stored before, now it is blocked, and if sensor data was being blocked before, not it is being stored.

Figure 10A:
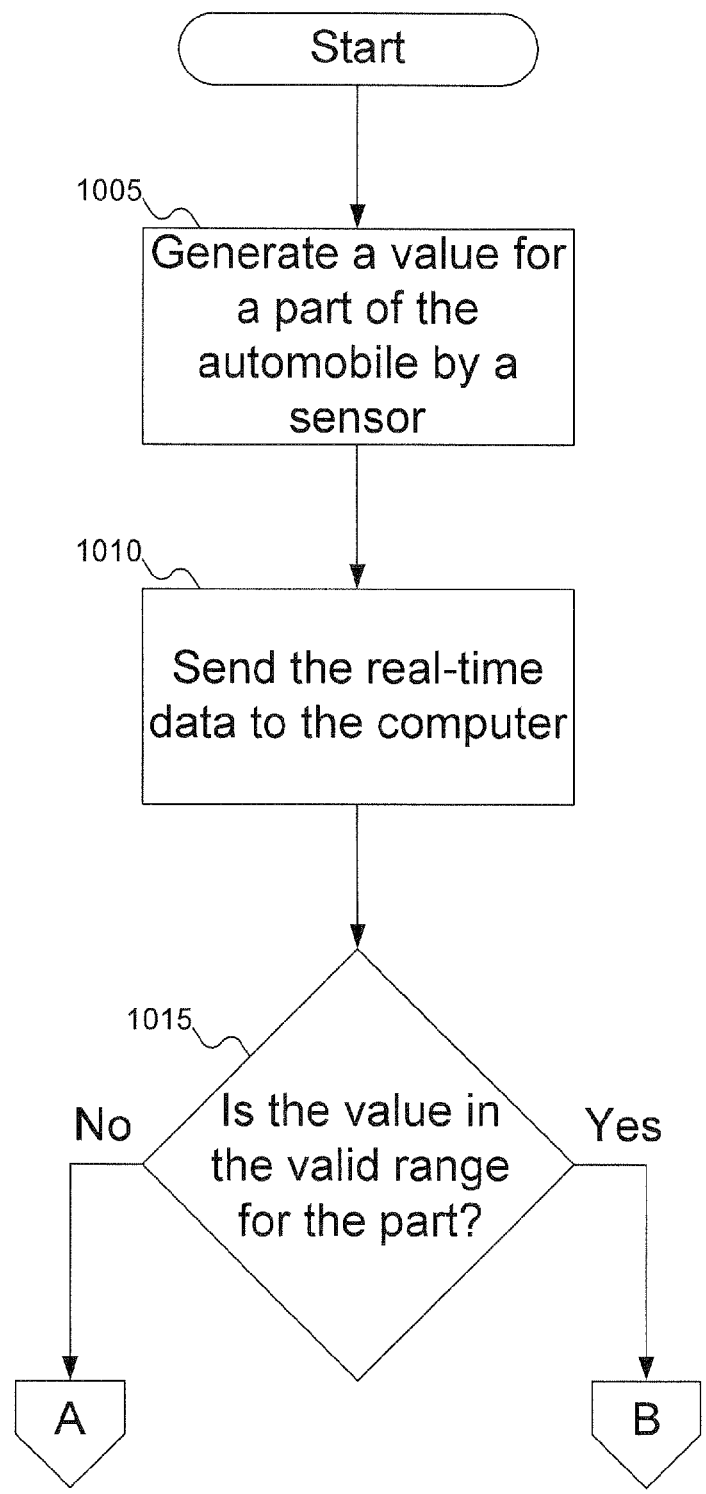
FIGS. 10A-10B show a flowchart of the procedure used by the computer of FIG. 1 to alert the user of the automobile of FIG. 1 about a problem, according to an embodiment of the invention.
Figure 10B:
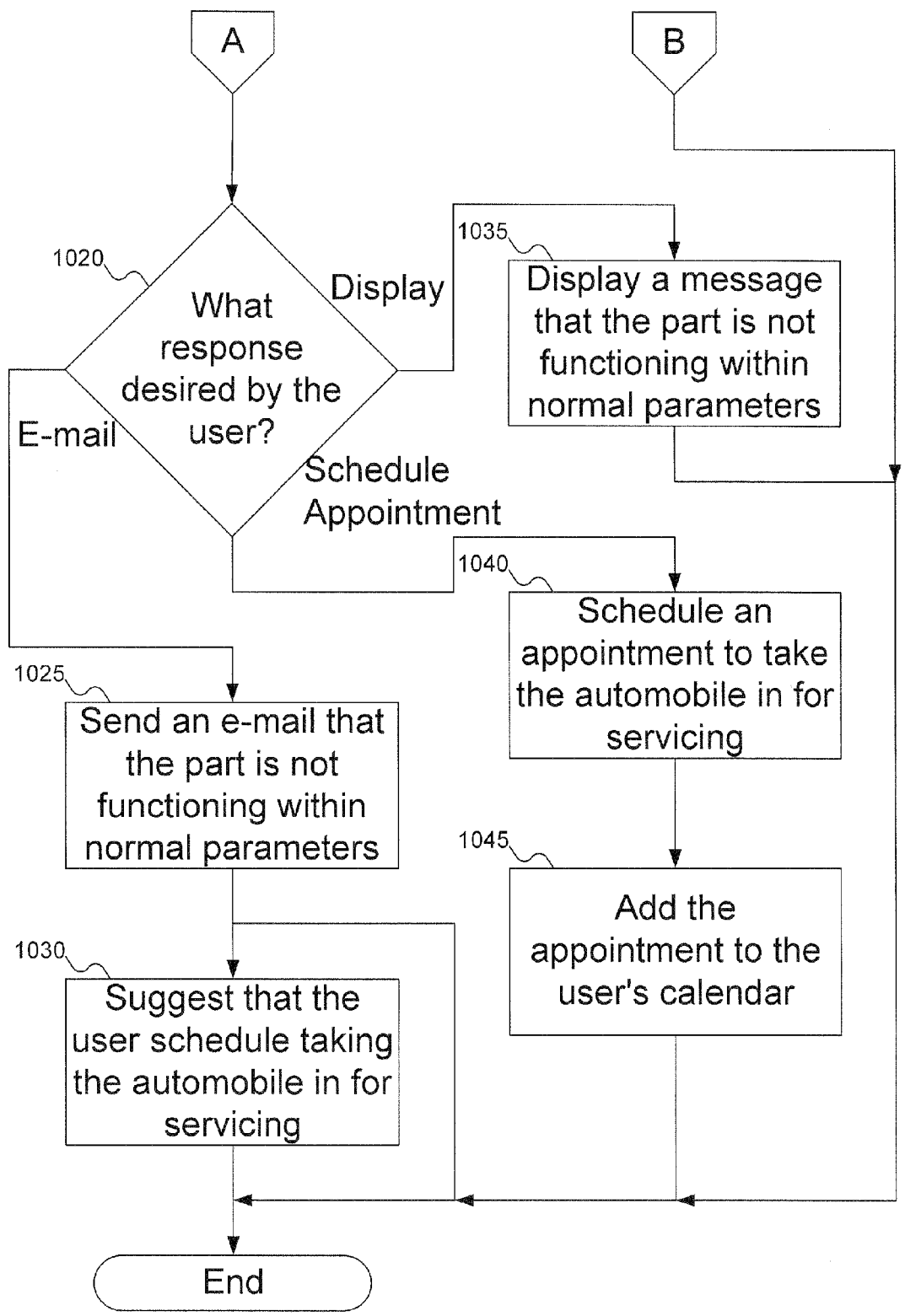

FIGS. 10A-10B show a flowchart of the procedure used by the computer of FIG. 1 to alert the user of the automobile of FIG. 1 about a problem, according to an embodiment of the invention. At block 1005, a sensor generates a value for a part of the automobile. At block 1010, the sensor sends this value to the computer. At decision point 1015, the computer determines whether the received value is within the range of proper values for the part. If the value is out of range, then at decision point 1020 (FIG. 10B), the computer determines how the user wants to be notified. If the user wants to be notified by e-mail, then at block 1025 the computer sends an e-mail to the user, informing him that the part is not functioning as expected. The computer may also suggest (and carry out) scheduling an appointment to bring the automobile in for servicing. If the user wants to be presented the information on a display, then at block 1035 the computer displays a message to the user, alerting him that the part is not functioning normally. Finally, if the user wants the computer to schedule an appointment to have the automobile serviced, then at block 1040 the automobile automatically schedules an appointment for servicing the automobile, and at block 1045 the computer adds the appointment to the user's calendar.

Figure 11A:
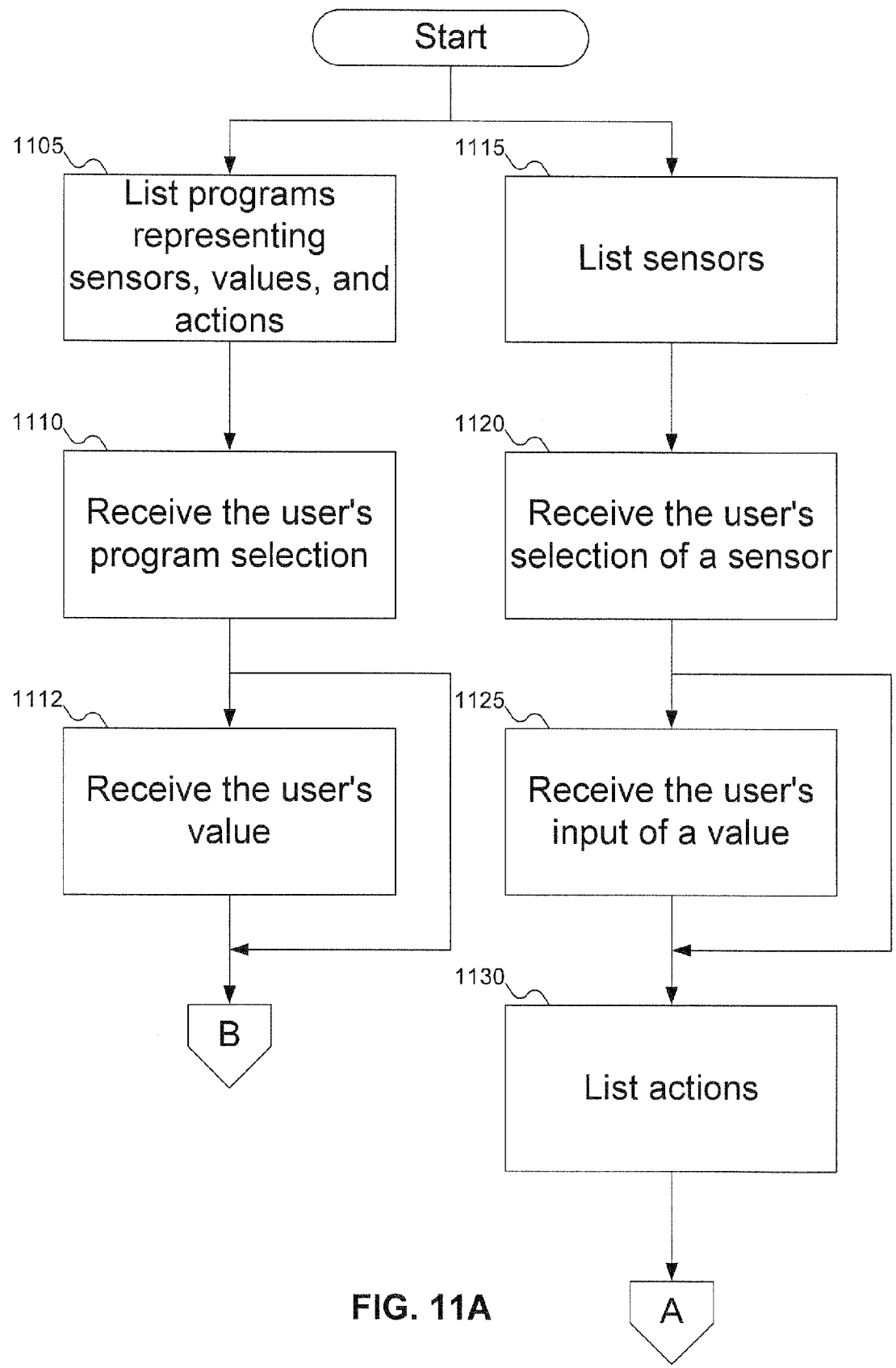
FIGS. 11A-11B show a flowchart of the procedure for the user of the automobile of FIG. 1 to program the computer of FIG. 1, according to an embodiment of the invention.
Figure 11B:
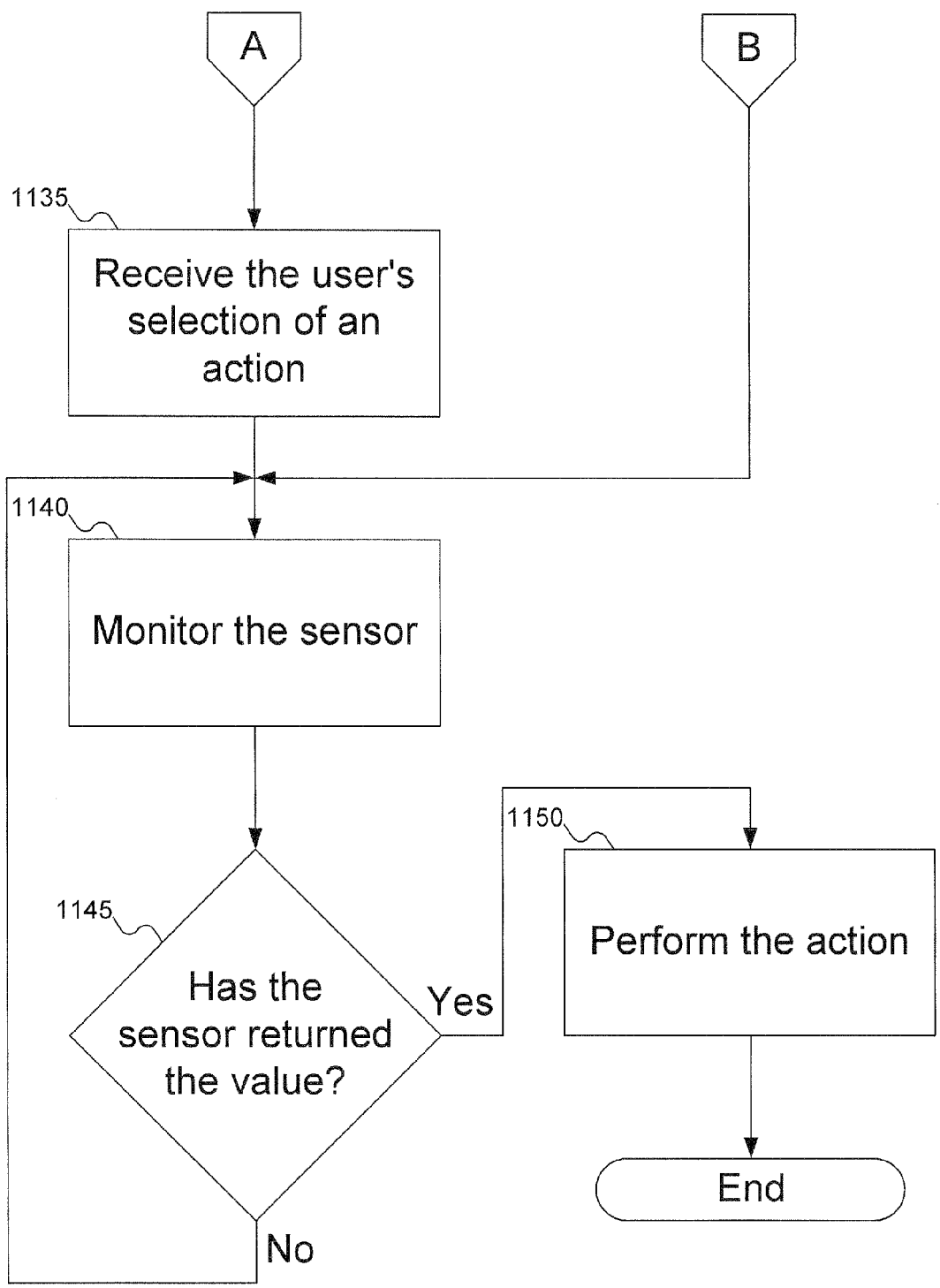

FIGS. 11A-11B show a flowchart of the procedure for the user of the automobile of FIG. 1 to program the computer of FIG. 1, according to an embodiment of the invention. As discussed above with reference to FIG. 5, programming may be done by either selecting a pre-defined program or creating one's own using a programming language. The two columns in FIG. 11 reflect these two variations. If the user is to be presented with a list of programs, then at block 1105 the programs are listed, each program including a sensor, a target value, and an action. At block 1110 the computer receives the user's selection, and at block 1112 the computer receives the user's target value. Note that as discussed above with reference to FIG. 5, the value might be implicit in the program, and block 1112 may be skipped (because no value is needed from the user). For example, when the program is to lock the doors when the ignition is turned on, the value is binary.

In the alternative, where the user defines a program for himself, at block 1115 the computer lists the available sensors. At block 1120, the user selects a sensor (and maybe more than one). At block 1125 the user defines a value for any of the sensors that need values. At block 1130, the computer lists the available actions, and at block 1135 (FIG. 11B) the user selects one or more actions.

Regardless of how the user selects or creates a program, at block 1140 the computer monitors the selected sensor(s). At decision point 1145, the computer determines if the sensors are returning values in the specified ranges. If the selected sensors all return values in the specified range, then at block 1150 the action(s) are performed. If not, then control returns to block 1140.

A person skilled in the art will recognize that an embodiment of the invention described above may be implemented using a computer. In that case, the method is embodied as instructions that comprise a program. The program may be stored on computer-readable media, such as floppy disks, optical disks (such as compact discs), or fixed disks (such as hard drives). The program may then be executed on a computer to implement the method. A person skilled in the art will also recognize that an embodiment of the invention described above may include a computer-readable modulated carrier signal.

Having illustrated and described the principles of the invention in an embodiment thereof, it should be readily apparent to those skilled in the art that an embodiment of the invention may be modified in arrangement and detail without departing from such principles. All modifications coming within the spirit and scope of the accompanying claims are claimed.

The invention claimed is:

1. An automobile, comprising:
   a part in the automobile;
   a sensor operative to generate real-time data about the part in the automobile;
   a computer in the automobile operative to receive the real-time data from the sensor and send a message to a device if the real-time data includes a value that is outside a valid range for the part, thereby indicating that the part is operating improperly, the valid range received from a user; and
   a storage associated with the computer operative to store the real-time data received by the computer from the sensor.

2. An automobile according to claim 1, wherein the device includes a second computer.

3. An automobile according to claim 1, further comprising a docking station to which the device can be connected.

4. An automobile according to claim 1, wherein the computer includes a wireless transmitter operative to transmit the message to the device wirelessly.

5. An automobile according to claim 1, wherein the device is drawn from a set consisting of a notebook computer of the user, a handheld computer of the user, and a Personal Digital Assistant (PDA) of the user.

6. An automobile according to claim 1, wherein the automobile is capable of operating safely if the value in the real-time data is outside the valid range for the part.

7. An automobile according to claim 1, further comprising a switch, wherein the storage is operative to store the real-time data received by the computer from the sensor only when the switch is in an enabled state.

8. A method for monitoring diagnostics in an automobile, comprising:
   sensing a value for a part in the automobile;
   receiving the sensed value by a computer built into the automobile;
   storing the sensed value received by the computer built into the automobile;
   receiving a valid range for the part from a user;
   comparing the sensed value to the valid range for the part by the computer; and
   issuing a message to a device if the sensed value is outside the valid range.

9. A method according to claim 8, wherein issuing a message includes issuing a message to a second computer if the sensed value is outside the valid range.

10. A method according to claim 8, wherein issuing a message includes sending an electronic message to the device.

11. A method according to claim 8, wherein issuing a message includes adding an appointment to a calendar in the device.

12. A method according to claim 8, wherein issuing a message includes displaying the message on a display of the device.

13. A method according to claim 8, wherein issuing a message includes issuing the message to the device via a docking station.

14. A method according to claim 8, wherein issuing a message includes wirelessly transmitting the message to the device.

15. A method according to claim 8, wherein issuing a message to a device if the sensed value is outside the valid range includes issuing the message to the device if the sensed value is outside the valid range, the device drawn from a set consisting of a notebook computer of the user, a handheld computer of the user, and a Personal Digital Assistant (PDA) of the user.

16. A method according to claim 8, further comprising continuing to safely operate the automobile if the sensed value in the real-time data is outside the valid range for the part.

17. A method according to claim 8, wherein the storing is responsive to a switch being in an enabled state.

18. An article comprising:
a storage medium, said storage medium having stored thereon instructions, that, when executed by a computer built into an automobile, result in:
sensing a value for a part in the automobile;
receiving the sensed value by a computer built into the automobile;
storing the sensed value received by the computer built into the automobile;
receiving a valid range for the part from a user;
comparing the sensed value to the valid range for the part by the computer; and
issuing a message to a device if the sensed value is outside the valid range.

19. An article according to claim 18, wherein issuing a message includes sending an electronic message to the device.

20. An article according to claim 18, wherein issuing a message includes adding an appointment to a calendar in the device.

21. An article according to claim 18, wherein issuing a message to a device if the value is outside the valid range includes issuing the message to the device if the value is outside the valid range, the device drawn from a set consisting of a notebook computer of the user, a handheld computer of the user, and a Personal Digital Assistant (PDA) of the user.

22. An article according to claim 18, further comprising continuing to safely operate the automobile if the value in the real-time data is outside the valid range for the part.

* * * * *